(12) United States Patent
Markovic et al.

(10) Patent No.: US 10,679,642 B2
(45) Date of Patent: Jun. 9, 2020

(54) SIGNAL PROCESSING APPARATUS AND METHOD

(71) Applicants: Huawei Technologies Co., Ltd., Shenzhen (CN); UNIVERSITY OF CAMBRIDGE, Cambridge (GB)

(72) Inventors: Milos Markovic, Munich (DE); Karim Helwani, Munich (DE); Herbert Buchner, Cambridge (GB); Simon Godsill, Cambridge (GB)

(73) Assignees: Huawei Technologies Co., Ltd., Shenzhen (CN); University of Cambridge, Cambridge (GB)

( * ) Notice: Subject to any disclaimer, the term of this patent is extended or adjusted under 35 U.S.C. 154(b) by 155 days.

(21) Appl. No.: 16/013,650

(22) Filed: Jun. 20, 2018

(65) Prior Publication Data
US 2018/0301160 A1 Oct. 18, 2018

Related U.S. Application Data

(63) Continuation of application No. PCT/EP2015/080874, filed on Dec. 21, 2015.

(51) Int. Cl.
*G10L 21/0308* (2013.01)
*G10L 21/0272* (2013.01)
(Continued)

(52) U.S. Cl.
CPC ........ *G10L 21/0308* (2013.01); *G10L 17/005* (2013.01); *G10L 21/0272* (2013.01); *G10L 2021/02166* (2013.01)

(58) Field of Classification Search
CPC combination set(s) only.
See application file for complete search history.

(56) References Cited

U.S. PATENT DOCUMENTS 8,855,295 B1 10/2014 Chhetri et al.
9,384,757 B2 * 7/2016 Sugiyama ........... G10L 21/0272
(Continued)

FOREIGN PATENT DOCUMENTS

CN 1717721 A 1/2006
CN 101432805 A 5/2009
(Continued)

OTHER PUBLICATIONS

Buchner et al.,"Trinicon:a versatile framework for multichannel blind signal processing", Proceedings (ICASSP'04), IEEE International Conference on Acoustics, Speech, and Signal Processing, 2004, XP010718333, Institute of Electrical and Electronics Engineers, New York, New York (2004).

(Continued)

*Primary Examiner* — Mohammad K Islam
(74) *Attorney, Agent, or Firm* — Leydig, Voit & Mayer, Ltd.

(57) ABSTRACT

A signal processing apparatus and method are provided for separating a plurality of mixture signals from a MIMO system to iteratively obtain a plurality of output signals. The plurality of mixture signals are a response of the MIMO system to a plurality of source signals. The signal processing apparatus comprises a plurality of blind source separators including a first blind source separator based on a first blind source separation technique or algorithm and a second blind source separator based on a second blind source separation technique or algorithm, wherein the first blind source separator is configured to compute a first plurality of preliminary output signals on the basis of a first set of coefficients describing the MIMO system and wherein the second blind source separator is configured to compute a second plurality of preliminary output signals on the basis of a second set of coefficients describing the MIMO system.

15 Claims, 3 Drawing Sheets

(51) Int. Cl.
G10L 17/00 (2013.01)
G10L 21/0216 (2013.01)

(56) References Cited

U.S. PATENT DOCUMENTS

| | | | | |
|---|---|---|---|---|
| 10,114,891 B2* | 10/2018 | Ozerov | ............... | G10L 21/0272 |
| 2007/0025556 A1* | 2/2007 | Hiekata | ............... | G10L 21/0272 |
| | | | | 381/17 |
| 2009/0012779 A1* | 1/2009 | Ikeda | ................. | G10L 21/0272 |
| | | | | 704/205 |
| 2012/0045066 A1* | 2/2012 | Nakadai | ................ | G10L 21/028 |
| | | | | 381/20 |
| 2013/0142343 A1* | 6/2013 | Matsui | ................. | G10L 21/028 |
| | | | | 381/56 |

FOREIGN PATENT DOCUMENTS

| | | | |
|---|---|---|---|
| CN | 101484938 A | | 7/2009 |
| CN | 101667425 A | | 3/2010 |
| CN | 102903368 A | | 1/2013 |
| CN | 103281269 A | | 9/2013 |
| CN | 104995679 A | | 10/2015 |
| DE | 4121356 | * | 6/1992 |
| EP | 1748427 A1 | | 1/2007 |
| WO | 2004053839 A1 | | 6/2004 |
| WO | WO 2005-295377 | * | 9/2004 |

OTHER PUBLICATIONS

Gilbert et al.,"Competitive algorithm blending for enhanced source separation", 2014 48th Asilomar Conference on Signals Systems and Computers XP032769314, Institute of Electrical and Electronics Engineers, New York, New York (2014).

Buchner et al., "Relation Between Blind System Identification and Convolutive Blind Source Separation," HSCMA, Rutgers University, Piscataway, New Jersey, USA, (Mar. 17-18, 2005).

Hyvarinen et al., "Independent Component Analysis," John Wiley and Sons, Inc. A Wiley Interscience Publication, (Mar. 2001).

Buchner et al., Blind Source Separation for Convolutive Mixtures Exploiting Nongaussianity, Nonwhiteness, and Nonstationarity, Conf. Rec. IEEE Intl. Workshop on Acoustic Echo and Noise Control (IWAENC), Kyoto, Japan, pp. 275-278, (Sep. 2003).

Buchner et al., "Trinicon for Dereverberation of Speech and Audio Signals," In P.A. Naylor and N.D. Gaubitch (eds.), Speech Dereverberation, Springer-Verlag, London, (2010).

Buchner et al., "Blind Source Separation for Convolutive Mixtures: A Unified Treatment," In Y.Huang and J. Benesty (eds.), Audio Signal Processing, Kluwer Academic Publishers, Boston, (Feb. 2004).

Buchner et al., "A Generalization of Blind Source Separation Algorithms for Convolutive Mixtures Based on Second-Order Statistics," IEEE Transactions on Speech and Audio Processing, vol. 13, No. 1, Institute of Electrical and Electronics Engineers, New York, New York (Jan. 2005).

Aichner et al., "Exploiting Narrowband Efficiency for Broadband Convolutive Blind Source Separation," Hindawi Publishing Corporation EURASIP Journal on Advances in Signal Processing vol. 2007, Article ID 16381, (2007).

Kim et al., "Independent Vector Analysis: An Extension of ICA to Multivariate Components," in Proc. Int. Conf. on Independent Component Analysis (ICA), (Retrieved Dec. 21, 2015).

Hiroe, "Solution of Permutation Problem in Frequency Domain ICA, Using Multivariate Probability Density Functions," Springer Link, Independent Component Analysis and Blind Signal Separation, vol. 3889 of the series Lecture Notes in Computer Science, (Retrieved Dec. 21, 2015).

Naylor et al., "Speech Dereverberation," Signals and Communication Technology, Springer-Verlag London Limited (2010).

Buchner et al., "A Systematic Approach to Incorporate Deterministic Prior Knowledge in Broadband Adaptive MIMO Systems," 2010 IEEE, Institute of Electrical and Electronics Engineers, New York, New York (2010).

Buchner et al., "Trinicon-based blind system identification with application to multiple-source localization and separation," Blind Speech Separation, Springer-Verlag, Berlin/Heidelberg, (2007).

Wang Nana, "Research on Blind Source Separation Algorithm of convolutive mixture," pp. 1-81, Hebei University of Technology, China (Dec. 2013). With English abstract.

* cited by examiner

Fig. 1 (State of the art)

SIGNAL PROCESSING APPARATUS AND METHOD

CROSS-REFERENCE TO RELATED APPLICATIONS

This application is a continuation of International Application No. PCT/EP2015/080874, filed on Dec. 21, 2015, the disclosure of which is hereby incorporated by reference in its entirety.

TECHNICAL FIELD

Embodiments of the present invention relate to the field of signal processing. More specifically, the embodiments of the present invention relate to an audio signal processing apparatus and method for blind source separation.

BACKGROUND

In the field of audio or acoustic signal processing, the set of propagation paths between multiple sound sources in a reverberant environment and multiple microphones is typically modeled as a linear Multiple-Input/Multiple-Output (MIMO) filter with finite impulse responses (FIR). In such a MIMO-FIR system each microphone picks up mixtures of the reverberated, i.e. "filtered", source signals. Generally, the MIMO mixing system itself is not directly accessible, only the received microphone signals.

In general, the MIMO mixing system contains all analyzable information about an acoustic scenario. Once this MIMO mixing system is known, one can, for instance, extract the original source signals, estimate the source positions within a room, analyze the acoustic structure/reflections of the room and estimate the reverberation time of the room.

Hence, for acoustic scene analysis, a very desirable goal is to estimate the MIMO mixing system using only the available microphone signals, which is also known as blind MIMO system identification. A precise blind MIMO system identification can be regarded as the optimal acoustic scene analysis.

It has been shown that there is a fundamental relation between a blind MIMO system identification and a broadband blind source separation (BSS) for convolutive mixtures (see H. Buchner, R. Aichner, and W. Kellermann, "Relation between Blind System Identification and Convolutive Blind Source Separation," Conf Rec. Joint Workshop on Hands-Free Speech Communication and Microphone Arrays (HSCMA), Piscataway, N.J., USA, March 2005). Thus, a broadband blind source separation (BSS) for convolutive mixtures can be used to solve the blind MIMO system identification problem, and, hence, the acoustic scene analysis problem.

Figure 1:
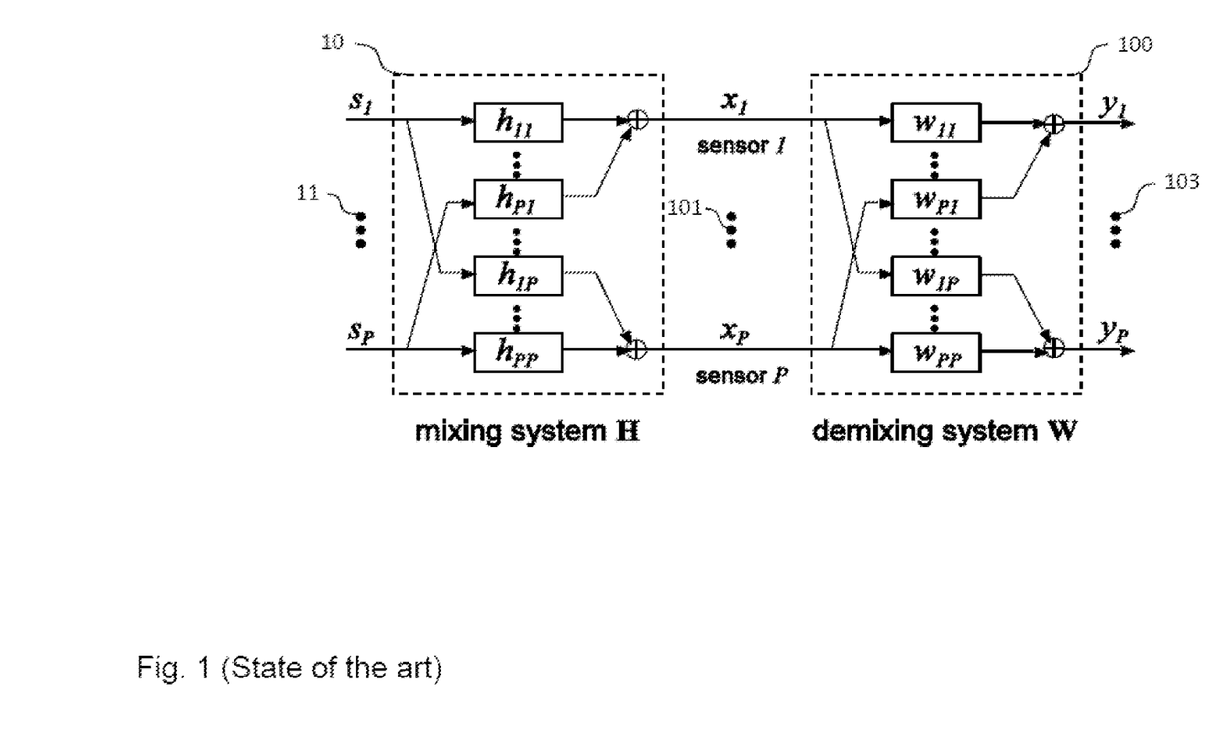
FIG. 1 shows a schematic diagram illustrating a general blind source separation scenario including a mixing system and a demixing system.

In broadband blind source separation for convolutive mixtures the original goal is to determine a MIMO-FIR demixing system based only on the available microphone signals using a BSS technique or algorithm from a wide variety of BSS algorithms. FIG. 1 shows the basic setup for a BSS scenario including a mixing system 10 and a demixing system 100. The mixing system 10 can be described by a mixing matrix H, which represents all acoustic propagation paths from the original acoustic sources in the room, i.e. the source signals 11 $s_1, \ldots, s_p$, to the P sensors, e.g. microphones, which pick up the mixture signals 101 $x_1, \ldots, x_p$. The demixing system 100 can be described by a demixing matrix W representing the digital signal processing system which generates the output signals 103 $y_1, \ldots, y_p$. In case of an ideal demixing system 100, these output signals 103 are identical to the demixed source signals 11. Generally, the MIMO-FIR demixing system 100 has to be continuously adapted due to the potential time dependence of source positions and/or room acoustics and, thus, of the mixing system 10.

From the plurality of available BSS techniques or algorithms the most fundamental BSS technique taking into account multiple microphone channels is called Independent Component Analysis (ICA), originally developed for the simpler case of a memoryless (i.e., instantaneous) mixing matrix (see A. Hyvärinen, J. Karhunen and E. Oja, Independent Component Analysis, Wiley & Sons, New York, 2001). ICA for BSS is based on the practically reasonable assumption of mutual statistical independence between the source signals. The demixing matrix W is then optimized such that its output signals become statistically independent again.

Broadband BSS for convolutive mixtures (using MIMO-FIR demixing systems) requires simultaneous exploitation of multiple fundamental statistical signal properties, namely at least "nonwhiteness" and "nonstationarity" or "nonwhiteness" and "nongaussianity". These are also the minimal requirements for performing blind MIMO system identification. Exploiting all three fundamental statistical signal properties, namely nonstationarity, nongaussianity and nonwhiteness is desirable and leads to improved versatility and higher convergence speed and accuracy (see H. Buchner, R. Aichner, and W. Kellermann, "Blind Source Separation for Convolutive Mixtures Exploiting Nongaussianity, Nonwhiteness, and Nonstationarity," Conf. Rec. IEEE Intl. Workshop on Acoustic Echo and Noise Control (IWAENC), Kyoto, Japan, pp. 275-278, September 2003).

A unified algorithmic framework has been developed under the name TRINICON (Triple-N ICA for CONvolutive mixtures) extending ICA to broadband sources, convolutive mixtures, and a systematic incorporation of all three fundamental statistical signal properties (see H. Buchner and W. Kellermann, "TRINICON for dereverberation of speech and audio signals," In P. A. Naylor and N. D. Gaubitch (eds.), Speech Dereverberation, Springer-Verlag, London, pp. 311-385, Jul. 2010 for a comprehensive review). It has been shown that the TRINICON framework essentially includes all currently known major classes of adaptive MIMO filtering algorithms, including all (convolutive and instantaneous) ICA algorithms, as specializations/approximations of the generic formulation.

All currently known real-time implementations of adaptive acoustic MIMO systems also represent such approximations due to computational complexity restrictions, i.e., they all implement certain subsets of the TRINICON features, such as linear convolutionsor broadband signal processing, and usually consider at most only two of the fundamental statistical signal properties (nonstationarity, nonwhiteness, nongaussianity).

In the light of the above, there is still a need for a computationally efficient realization of broadband BSS for convolutive mixtures and, thus, for optimal acoustic scene analysis, which can exploit all fundamental statistical signal properties simultaneously, namely nonstationarity, nongaussianity and nonwhiteness.

SUMMARY

Embodiments of the present disclosure provide an improved signal processing apparatus and method, in particular, for a computationally efficient realization of broadband blind source separation for convolutive mixtures allowing exploiting the fundamental statistical signal properties of nonstationarity, nongaussianity and nonwhiteness.

The foregoing and other objects are achieved by the subject matter of the independent claims. Further implementation forms are apparent from the dependent claims, the description and the figures.

According to a first aspect, embodiments of the invention relate to a signal processing apparatus for separating a plurality of mixture signals from a MIMO system to iteratively obtain a plurality of output signals, the plurality of mixture signals being the response of the MIMO system to a plurality of source signals. The signal processing apparatus comprises a plurality of blind source separators including a first blind source separator based on a first blind source separation technique or algorithm and a second blind source separator based on a second blind source separation technique or algorithm, wherein the first blind source separator is configured to compute a first plurality of preliminary output signals on the basis of a first set of coefficients describing the MIMO system and wherein the second blind source separator is configured to compute a second plurality of preliminary output signals on the basis of a second set of coefficients describing the MIMO system.

Moreover, the signal processing apparatus comprises a combiner configured to combine the first plurality of preliminary output signals with the second plurality of preliminary output signals on the basis of a set of combiner coefficients to iteratively obtain the plurality of output signals, wherein each combiner coefficient is associated with, i.e. weights, a blind source separator of the plurality of blind source separators. Moreover, the signal processing apparatus comprises an adjuster configured to iteratively adjust the first set of coefficients of the first blind source separator and the second set of coefficients of the second blind source separator on the basis of the plurality of output signals.

The signal processing apparatus according to the first aspect provides a computationally efficient, iterative realization of broadband blind source separation for convolutive mixtures allowing, for instance, exploiting the fundamental statistical signal properties of nonstationarity, nongaussianity and nonwhiteness.

In a first possible implementation form of the signal processing apparatus according to the first aspect as such, the adjuster is further configured to adjust the set of combiner coefficients on the basis of the plurality of output signals.

In a second possible implementation form of the signal processing apparatus according to the first implementation form of the first aspect, the adjuster is configured to adjust the set of combiner coefficients on the basis of the plurality of output signals by separating the first plurality of preliminary output signals and the second plurality of preliminary output signals using a third blind source separation technique.

Thus, in this implementation form the third blind source separation technique is used for adjusting the set of combiner coefficients on the basis of the plurality of output signals in the same way as for blind source separation. In an implementation form, the first plurality of preliminary output signals and the second plurality of preliminary output signals are considered to be statistically independent and the set of combiner coefficients is adjusted on the basis of the plurality output signals using the third blind source separation technique by adjusting the set of combiner coefficients in such a way that the output signals become statistically independent.

In a third possible implementation form of the signal processing apparatus according to the second implementation form of the first aspect, the third blind source separation technique used by the adjuster to adjust the set of combiner coefficients is an independent component analysis (ICA).

ICA provides a fast and memoryless blind source separation technique for adjusting the set of combiner coefficients.

In a fourth possible implementation form of the signal processing apparatus according to the first aspect as such or any one of the first to third implementation form thereof, the combiner is configured to combine the first plurality of preliminary output signals with the second plurality of preliminary output signals on the basis of the set of combiner coefficients as a linear combination of a first preliminary output signal of the first plurality of preliminary output signals and a first preliminary output signal of the second plurality of preliminary output signals weighted by the set of combiner coefficients to obtain a first output signal of the plurality of output signals and as a linear combination of a second preliminary output signal of the first plurality of preliminary output signals and a second preliminary output signal of the second plurality of preliminary output signals weighted by the set of combiner coefficients to obtain a second output signal of the plurality of output signals.

Thus, the output signals can be respective sums of the respective pluralities of preliminary output signals provided by the respective blind source separators weighted by the set of combiner coefficients.

In a fifth possible implementation form of the signal processing apparatus according to the fourth implementation form of the first aspect, the combiner is configured to select at least one blind source separator from the plurality of blind source separators and to set the combiner coefficients associated with the other blind source separators of the plurality of blind source separators equal to zero.

Thus, depending on the MIMO system, which may vary over time, this implementation form allows to reduce the computational complexity by selecting only a subset of the blind source separators of the signal processing apparatus for iteratively computing the output signals.

In a sixth possible implementation from of the signal processing apparatus according to the fifth implementation form of the first aspect, the combiner is configured to select the at least one blind source separator from the plurality of blind source separators on the basis of a performance measure of the plurality of blind source separators.

This implementation form allows selecting only a subset of the blind source separators of the signal processing apparatus on the basis of a performance measure of the blind source separators in order to reduce the computational complexity, for instance, only the best performing blind source separators.

In a seventh possible implementation form of the signal processing apparatus according to the sixth implementation form of the first aspect, the performance measure is a cost function based on the Karhunen-Loeve transform.

In an eighth possible implementation form of the signal processing apparatus according to the first aspect as such or any one of the first to seventh implementation form thereof, the adjuster is configured to adjust the first set of coefficients of the first blind source separator and the second set of coefficients of the second blind source separator on the basis of the plurality of output signals using a performance measure of the plurality of blind source separators. In an implementation form, this performance measure can be associated with an error between the plurality of output signals and a plurality of training source signals.

In a ninth possible implementation form of the signal processing apparatus according to the eighth implementation form of the first aspect, the performance measure is a cost function based on the Karhunen-Loeve transform.

In a tenth possible implementation form of the signal processing apparatus according to the first aspect as such or any one of the first to ninth implementation form thereof, the first blind source separation technique and/or the second blind source separation technique fulfill one or more of the following statistical conditions: nongaussianity, nonwhiteness and/or nonstationarity.

In an eleventh possible implementation form of the signal processing apparatus according to the first aspect as such or any one of the first to tenth implementation form thereof, the first blind source separator is based on a first convolutive blind source separation technique and/or the second blind source separator is based on a second convolutive blind source separation technique.

In a twelfth possible implementation form of the signal processing apparatus according to the first aspect as such or any one of the first to eleventh implementation form thereof, the first blind source separator or the second blind source separator is based on one or more of the following blind source separation techniques: principal components analysis, singular value decomposition, independent component analysis, dependent component analysis and non-negative matrix factorization.

According to a second aspect, embodiments of the invention relate to a signal processing method of separating a plurality of mixture signals from a MIMO system to iteratively obtain a plurality of output signals, the plurality of mixture signals being the response of the MIMO system to a plurality of source signals. The signal processing method comprises the steps of computing a first plurality of preliminary output signals on the basis of a first set of coefficients describing the MIMO system using a first blind source separator based on a first blind source separation technique and a second plurality of preliminary output signals on the basis of a second set of coefficients describing the MIMO system using a second blind source separator based on a second blind source separation technique, combining the first plurality of preliminary output signals with the second plurality of preliminary output signals on the basis of a set of combiner coefficients to obtain the plurality of output signals, and adjusting the first set of coefficients of the first blind source separator and the second set of coefficients of the second blind source separator on the basis of the plurality of output signals.

The signal processing method according to embodiments of the second aspect of the invention can be performed by the signal processing apparatus according to the first aspect of the invention. Further features of the signal processing method according to the second aspect of the invention result directly from the functionality of the signal processing apparatus according to the first aspect of the invention and its different implementation forms and vice versa.

More specifically, in first possible implementation form of the signal processing method according to the second aspect as such, the method comprises the further step of adjusting the set of combiner coefficients on the basis of the plurality of output signals.

In a second possible implementation form of the signal processing method according to the first implementation form of the second aspect, the step of adjusting the set of combiner coefficients on the basis of the plurality of output signals comprises the step of separating the first plurality of preliminary output signals and the second plurality of preliminary output signals using a third blind source separation technique.

In a third possible implementation form of the signal processing method according to the second implementation form of the second aspect, the third blind source separation technique used for adjusting the set of combiner coefficients is an independent component analysis.

In a fourth possible implementation form of the signal processing method according to the second aspect as such or any one of the first to third implementation form thereof, the step of combining the first plurality of preliminary output signals with the second plurality of preliminary output signals comprises the step of combining the first plurality of preliminary output signals with the second plurality of preliminary output signals on the basis of the set of combiner coefficients as a linear combination of a first preliminary output signal of the first plurality of preliminary output signals and a first preliminary output signal of the second plurality of preliminary output signals weighted by the set of combiner coefficients to obtain a first output signal of the plurality of output signals and as a linear combination of a second preliminary output signal of the first plurality of preliminary output signals and a second preliminary output signal of the second plurality of preliminary output signals weighted by the set of combiner coefficients to obtain a second output signal of the plurality of output signals.

In a fifth possible implementation form of the signal processing method according to the fourth implementation form of the second aspect, the step of combining the first plurality of preliminary output signals with the second plurality of preliminary output signals comprises the steps of selecting at least one blind source separator from the plurality of blind source separators and setting the combiner coefficients associated with the other blind source separators of the plurality of blind source separators equal to zero.

In a sixth possible implementation form of the signal processing method according to the fifth implementation form of the second aspect, the step of selecting at least one blind source separator from the plurality of blind source separators comprises the step of selecting the at least one blind source separator from the plurality of blind source separators on the basis of a performance measure of the plurality of blind source separators.

In a seventh possible implementation form of the signal processing method according to the sixth implementation form of the second aspect, the performance measure is a cost function based on the Karhunen-Loeve transform.

In an eighth possible implementation form of the signal processing method according to the second aspect as such or any one of the first to seventh implementation form thereof, the step of adjusting the first set of coefficients of the first blind source separator and the second set of coefficients of the second blind source separator comprises the step of adjusting the first set of coefficients of the first blind source separator and the second set of coefficients of the second blind source separator on the basis of a performance measure of the plurality of blind source separators.

In a ninth possible implementation form of the signal processing method according to the eighth implementation form of the second aspect, the performance measure is a cost function based on the Karhunen-Loeve transform.

In a tenth possible implementation form of the signal processing method according to the second aspect as such or any one of the first to ninth implementation form thereof, the first blind source separation technique and/or the second blind source separation technique fulfill one or more of the following statistical conditions: nongaussianity, nonwhiteness and/or nonstationarity.

In an eleventh possible implementation form of the signal processing method according to the second aspect as such or any one of the first to tenth implementation form thereof, the first blind source separator is based on a first convolutive blind source separation technique and/or the second blind source separator is based on a second convolutive blind source separation technique.

In a twelfth possible implementation form of the signal processing method according to the second aspect as such or any one of the first to eleventh implementation form thereof, the first blind source separator or the second blind source separator is based on one or more of the following blind source separation techniques: principal components analysis, singular value decomposition, independent component analysis, dependent component analysis and non-negative matrix factorization.

According to a third aspect, embodiments of the invention relate to a computer program comprising program code for performing the signal processing method according to the second aspect of the invention or any of its implementation forms when executed on a computer.

The invention can be implemented in hardware and/or software.

BRIEF DESCRIPTION OF THE DRAWINGS

Further embodiments of the invention will be described with respect to the following figures, wherein.

In the various figures, identical reference signs have been used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 2:
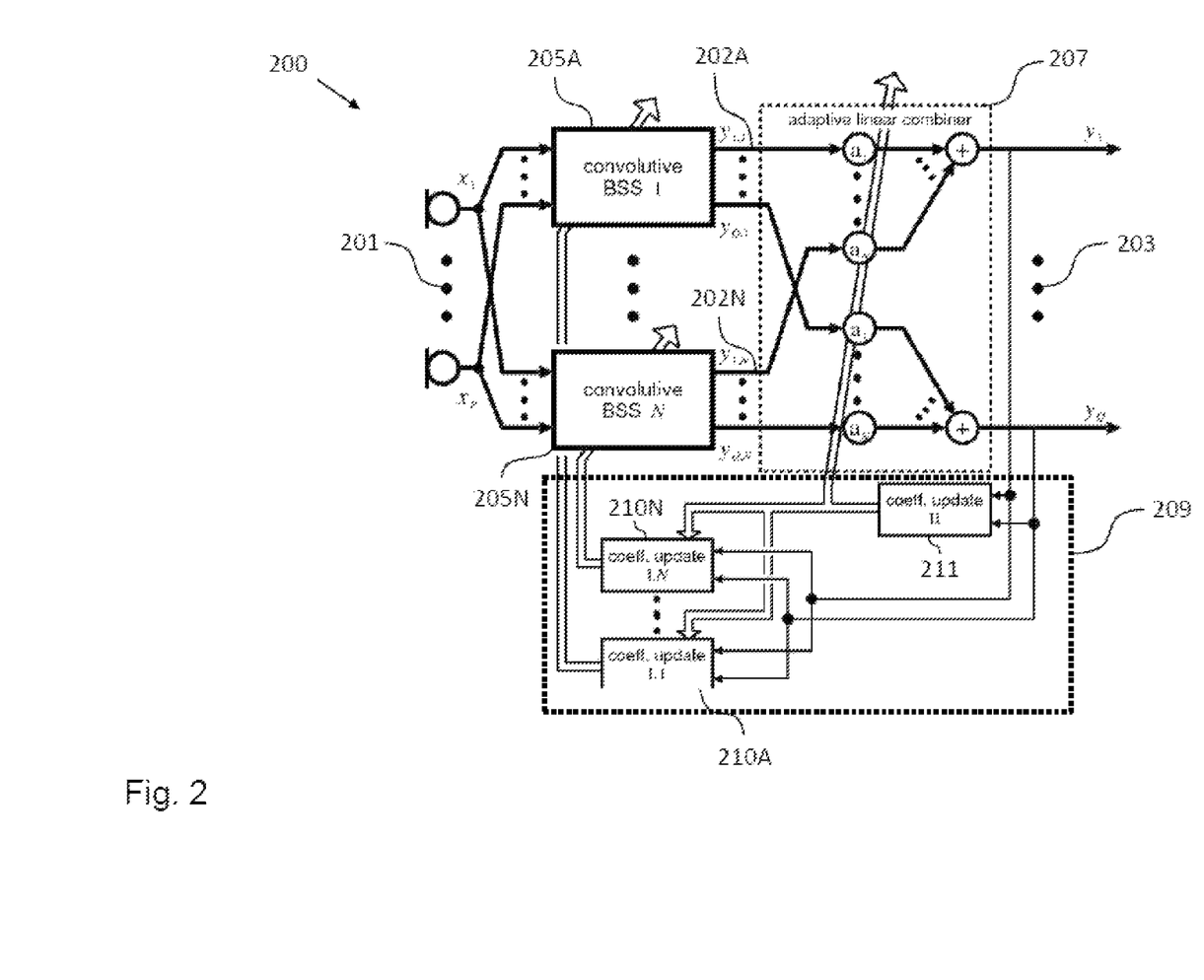
FIG. 2 shows a schematic diagram illustrating a signal processing apparatus according to an embodiment.

FIG. 2 shows a schematic diagram illustrating a signal processing apparatus 200 according to an embodiment. The signal processing apparatus 200 is configured to separate a plurality of mixture signals 201 from a MIMO system, such as the mixing system 10 shown in FIG. 1, to iteratively obtain a plurality of output signals 203, wherein the plurality of mixture signals 201 being the response of the MIMO system, such as the mixing system shown in FIG. 1, to a plurality of source signals, such as the plurality of source signals 11 shown in FIG. 1.

The signal processing apparatus 200 comprises a plurality of blind source separators 205A-N including a first blind source separator 205A based on a first blind source separation technique or algorithm and a second blind source 205N separator based on a second blind source separation technique or algorithm different to the first blind source separation technique. The first blind source separator 205A is configured to compute a first plurality of preliminary output signals 202A on the basis of a first set of coefficients describing the MIMO system, such as the mixing system 10 shown in FIG. 1, and the second blind source separator 205N is configured to compute a second plurality of preliminary output signals 202N on the basis of a second set of coefficients describing the MIMO system, such as the mixing system 10 shown in FIG. 1.

Thus, the first blind source separator 205A and the second blind source separator 205N (as well as potential further blind source separators) perform a blind source separation in parallel using different blind source separation techniques. In an embodiment, the first set of coefficients describing the MIMO system is defined by the coefficients of the demixing matrix for transforming the plurality of mixture signals 201 into the first plurality of preliminary output signals 202A. In an embodiment, the second set of coefficients describing the MIMO system is defined by the coefficients of the demixing matrix for transforming the plurality of mixture signals 201 into the second plurality of preliminary output signals 202N.

In an embodiment, the first blind source separation technique used by the first blind source separator 205A and/or the second blind source separation technique used by the second blind source separator 205N fulfill one or more of the following statistical conditions: nongaussianity, nonwhiteness and/or nonstationarity.

In an embodiment, the first blind source separator 205A is based on a first convolutive blind source separation technique and/or the second blind source separator 205N is based on a second convolutive blind source separation technique. The term blind source separation with convolutive mixtures, i.e. a convolutive blind source separation technique, is used herein to describe a complex mixing process where the mixtures are weighted and delayed, and each source contributes to the sum with multiple delays corresponding to the multiple paths by which an acoustic signal propagates to a microphone.

In an embodiment, the first blind source separator 205A or the second blind source separator 205N is based on one or more of the following blind source separation techniques: principal components analysis, singular value decomposition, independent component analysis, dependent component analysis and non-negative matrix factorization.

As can be taken from the embodiment shown in FIG. 2, the signal processing apparatus 200 further comprises a combiner 207 configured to combine the first plurality of preliminary output signals 202A with the second plurality of preliminary output signals 202N (as well as any further preliminary output signals provided by additional blind source separators) on the basis of a set of combiner coefficients $a_1, \ldots, a_N$ to iteratively obtain the plurality of output signals 203. Each combiner coefficient $a_1, \ldots, a_N$ is associated with a blind source separator of the plurality of blind source separators 205A-N.

In the embodiment shown in FIG. 2, the combiner 207 is configured to combine the first plurality of preliminary output signals 202A with the second plurality of preliminary output signals 202N on the basis of the set of combiner coefficients $a_1, \ldots, a_N$ as a linear combination, i.e. a sum, of a first preliminary output signal of the first plurality of preliminary output signals 202A and a first preliminary output signal of the second plurality of preliminary output signals 202N weighted by the set of combiner coefficients $a_1, \ldots, a_N$ to obtain a first output signal of the plurality of output signals 203 and as a linear combination of a second preliminary output signal of the first plurality of preliminary output signals 202A and a second preliminary output signal of the second plurality of preliminary output signals 202N weighted by the set of combiner coefficients $a_1, \ldots, a_N$ to obtain a second output signal of the plurality of output signals 203. Thus, in an embodiment, the output signal $y_1$ of the plurality of output signals 203 is a sum of the first preliminary output signal $y_{1,1}$ of the first plurality of preliminary output signals 202A weighted by the combiner coefficient $a_1$ and of the first preliminary output signal $y_{1,N}$ of the second plurality of preliminary output signals 202N weighted by the combiner coefficient $a_N$ (as well as any further first preliminary output signals $y_{i,1}$ provided by any additional blind source separators).

Moreover, the signal processing apparatus 200 shown in FIG. 2 comprises an adjuster 209 configured to iteratively adjust the first set of coefficients of the first blind source separator 205A and the second set of coefficients of the second blind source separator 205N on the basis of the plurality of output signals 203. This is illustrated by the blocks 210A and 210B of the adjuster 209 of the signal processing apparatus 200 shown in FIG. 2. In an embodiment, the first set of coefficients of the first blind source separator 205A and the second set of coefficients of the second blind source separator 205N are adjusted in a mutually independent way.

In an embodiment, the adjuster 209 is further configured to adjust the set of combiner coefficients $a_1, \ldots, a_N$ on the basis of the plurality of output signals 203. This is illustrated by the block 211 of the adjuster 209 of the signal processing apparatus 200 shown in FIG. 2.

In an embodiment, the adjuster 209 is configured to adjust the set of combiner coefficients $a_1, \ldots, a_N$ on the basis of the plurality of output signals 203 by separating the first plurality of preliminary output signals 202A and the second plurality of preliminary output signals 202N using a blind source separation technique. In other words, in an embodiment, the combiner coefficients $a_1, \ldots, a_N$ can be adjusted by the adjuster 209 in such a way that the output signals 203 become statistically independent. In an embodiment, the adjuster 209 can use an independent component analysis (ICA) for adjusting the set of combiner coefficients $a_1, \ldots, a_N$ on the basis of the plurality of output signals 203.

In an embodiment, the combiner 205 is configured to select at least one blind source separator from the plurality of blind source separators 205A-N and to set the combiner coefficients $a_1, \ldots, a_N$ associated with the other blind source separators of the plurality of blind source separators equal to zero. This embodiment allows, for instance, selecting or unselecting specific blind source separators from the plurality of blind source separators 205A-N. In an embodiment, this selection can be based on a respective performance measure of the different blind source separators 205A-N, such as a cost function based on the Karhunen-Loeve transform. Further details about the use of a performance measure in the form of a KLT cost function can be found, for instance, in H. Buchner and W. Kellermann, "TRINICON for dereverberation of speech and audio signals," In P. A. Naylor and N. D. Gaubitch (eds.), Speech Dereverberation, Springer-Verlag, London, pp. 311-385, July 2010, which is fully incorporated herein by reference.

Thus, in an embodiment, after each adjustment iteration, the plurality of preliminary output signals of the best performing blind source separator, for instance, the first plurality of preliminary output signals 202A provided by the first blind side separator 205A are chosen as the final output signals 203 and the current set of coefficients of the best performing blind source separator replace the current sets of coefficients of the other blind source separators for the next iteration step of the other blind source separators.

In an embodiment, the adjuster 209 can be further configured to adjust the first set of coefficients of the first blind source separator 205A and the second set of coefficients of the second blind source separator 205N on the basis of the plurality of output signals 203 using a respective performance measure associated with each of the plurality of blind source separators 205A-N of the signal processing apparatus 200. In an embodiment, this performance measure can be associated with an error between the plurality of output signals 203 and a plurality of training source signals. In an embodiment, the performance measure is a cost function based on the Karhunen-Loeve transform.

In an exemplary embodiment, the signal processing apparatus 200 shown in FIG. 2 comprises only two blind source separators based on the following blind source separation techniques or algorithms.

In this exemplary embodiment, the first blind source separator is based on a first class of efficient second-order statistics algorithms described, for instance, in H. Buchner, R. Aichner, and W. Kellermann, "Blind Source Separation for Convolutive Mixtures Exploiting Nongaussianity, Nonwhiteness, and Nonstationarity," Conf. Rec. IEEE Intl. Workshop on Acoustic Echo and Noise Control (IWAENC), Kyoto, Japan, pp. 275-278, September 2003, which fulfills the statistical conditions of nonwhiteness and nonstationarity.

In this exemplary embodiment, the second blind source separator is based on a second class of efficient multivariate time-frequency algorithms described, for instance, in H. Buchner, R. Aichner and W. Kellermann, "Blind source separation for convolutive mixtures: A unified treatment," In Y. Huang and J. Benesty (Hrsg.), Audio Signal Processing for Next-Generation Multimedia Communication Systems, Kluwer Academic Publishers, Boston/Dordrecht/London, pp. 255-293, Feb. 2004, which fulfills the statistical conditions of nonwhiteness and nongaussianity.

In this exemplary embodiment, the BSS algorithms of the first class can efficiently implement an exact linear convolution and broadband coefficient adaptation, but it can exploit only second-order signal statistics. In contrast, the BSS algorithms of the second class can exploit higher-order statistics, which is required for nongaussianity, but for efficiency reasons the coefficient update rules neglect certain constraints in its multivariate time-frequency formulation so that the strictly linear convolution is partly replaced by a circular convolution, which in turn may limit the separation performance of the algorithms of the second class. For these reasons, the combination of these two classes of algorithms as provided by the present invention is highly attractive.

For the BSS technique implemented for adjusting the coefficients $a_1, \ldots, a_N$ of the combiner 207 nonwhiteness is not essential. However, an implementation of this stage based on either nonstationarity, nongaussianity, and/or non-whiteness is possible.

Figure 3:
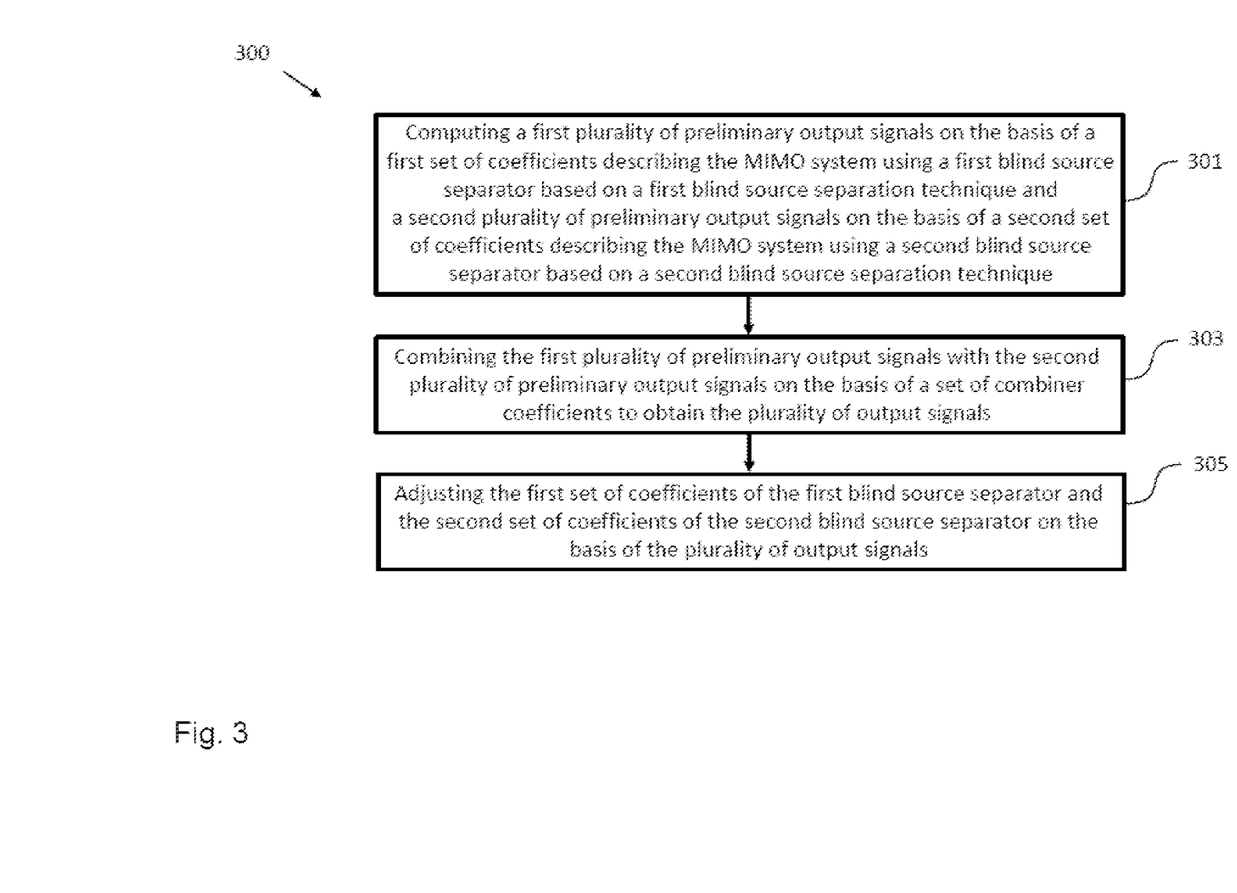
FIG. 3 shows a schematic diagram of a signal processing method according to an embodiment.

FIG. 3 shows a schematic diagram of a signal processing method 300 according to an embodiment. The signal processing method 300 is configured to separate a plurality of mixture signals 201 from a MIMO system to obtain a plurality of output signals 203, wherein the plurality of mixture signals 201 are the response of the MIMO system to a plurality of source signals.

The signal processing method 300 comprises a first step 301 of computing a first plurality of preliminary output signals 202A on the basis of a first set of coefficients describing the MIMO system using a first blind source separator 205A based on a first blind source separation technique and a second plurality of preliminary output signals 202N on the basis of a second set of coefficients describing the MIMO system using a second blind source separator 205N based on a second blind source separation technique.

The signal processing method 300 comprises a further step 303 of combining 303 the first plurality of preliminary output signals 202A with the second plurality of preliminary output signals 202N on the basis of a set of combiner coefficients to obtain the plurality of output signals 203.

The signal processing method comprises a final step 305 of adjusting the first set of coefficients of the first blind source separator and the second set of coefficients of the second blind source separator on the basis of the plurality of output signals 203.

In the following a mathematical relation between the plurality of mixing signals $x_1, \ldots, x_P$ 201 and the plurality of output signals $y_1, \ldots, y_Q$ 203 used in the signal processing apparatus shown in FIG. 2 and the signal processing method 300 shown in FIG. 3 is derived.

In a conventional MIMO demixing system with a single blind source separator the relation between the mixing signals $x_1, \ldots, x_P$ and the output signals $y_1, \ldots, y_Q$ can be expressed using the following equation:

$$y_q(n) = \sum_{p=1}^{P} \sum_{l=0}^{L-1} w_{pq,l} x_p(n-l), \quad (1)$$

wherein $w_{pq,l}$ denotes the set of coefficients associated with the single blind source separator, i.e. the filter coefficients of the demixing matrix W, and n denotes a time index. It was shown (see, for instance, H. Buchner and W. Kellermann, "TRINICON for dereverberation of speech and audio signals," In P. A. Naylor and N. D. Gaubitch (eds.), Speech Dereverberation, Springer-Verlag, London, pp. 311-385, July 2010) that equation 1 can be formulated in a more compact form as a matrix-vector formulation:

$$y(n) = W^T x(n), \quad (2)$$

wherein the vectors y(n) and x(n) and the matrix W are properly defined with compatible dimensions according to H. Buchner and W. Kellermann, "TRINICON for dereverberation of speech and audio signals," In P. A. Naylor and N. D. Gaubitch (eds.), Speech Dereverberation, Springer-Verlag, London, pp. 311-385, July 2010. Additionally, for algorithmic reasons, the vector y(n) also contains D delayed versions of the signal $y_q(n)$ of each output channel (q=1, . . . , P), i.e., the total dimension of y(n) is P D.

The demixing system defined by the signal processing apparatus 200 shown in FIG. 2 can be expressed using the following equation:

$$y_q(n) = \sum_{i=1}^{N} \alpha_i \sum_{l=0}^{L-1} w_{pq,l}^{(i)} x_p(n-l), \text{tm (3)}$$

wherein $\alpha_i$ denotes the combiner coefficients, i.e. the weighting factors for each preliminary output signal of the different blind source separators 205A-N. In the corresponding matrix-vector formulation, this reads:

$$y(n) = \sum_{i=1}^{N} (W^{(i)})^T x(n) \quad (4)$$

or using an equivalent formulation:

$$y(n) = \sum_{i=1}^{N} y^{(i)}(n), \quad (5)$$

with:

$$y^{(i)}(n) = (W^{(i)})^T x(n) \quad (6)$$

This expression can be interpreted as the i-th sub-system of a set of N parallel blind source separators 205A-N.

As already described above, in general, the separate blind source separators 205A-N are updated iteratively according to adjustment rules of the form:

$$W \leftarrow W - \mu \Delta W \quad (7)$$

wherein μ denotes a step size parameter and the update W is typically based on the gradient (with respect to the coefficient matrix W) of a certain cost function (see, e.g., H. Buchner and W. Kellermann, "TRINICON for dereverberation of speech and audio signals," In P. A. Naylor and N. D. Gaubitch (eds.), Speech Dereverberation, Springer-Verlag, London, pp. 311-385, July 2010).

By introducing the combiner 207 into the signal processing apparatus 200, it can be shown (using the chain rule) that the update/adjustment rule for the i-th parallel blind source separator is extended to:

$$W^{(i)} \leftarrow W^{(i)} - \mu \alpha_i \Delta W^{(i)}, \quad (8)$$

wherein $\Delta W^{(i)}$ can be based on the plurality of output signals $y_q$ 203, as already described above. This is illustrated in FIG. 2 by the arrow from block 211 to the blocks 210A-N.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A signal processing apparatus for separating a plurality of mixture signals from a MIMO system to obtain a plurality of output signals, the plurality of mixture signals are a response of the MIMO system to a plurality of source signals, the signal processing apparatus comprising:
a processor; and
a memory storing instructions that when executed by the processor configure the processor to function as a plurality of blind source separators, a combiner, and an adjuster, wherein:
the plurality of blind source separators include a first blind source separator based on a first blind source separation technique and a second blind source separator based on a second blind source separation technique, wherein the first blind source separator is configured to compute a first plurality of preliminary output signals based on a first set of coefficients describing the MIMO system and wherein the second blind source separator is configured to compute a second plurality of preliminary output signals based on a second set of coefficients describing the MIMO system;
the combiner is configured to combine the first plurality of preliminary output signals with the second plurality of preliminary output signals based on a set of combiner coefficients to obtain the plurality of output signals, wherein each combiner coefficient is associated with a blind source separator of the plurality of blind source separators; and
the adjuster is configured to adjust the first set of coefficients of the first blind source separator and the second set of coefficients of the second blind source separator based on the plurality of output signals.

2. The signal processing apparatus of claim 1, wherein the adjuster is further configured to adjust the set of combiner coefficients based on the plurality of output signals.

3. The signal processing apparatus of claim 2, wherein the adjuster is configured to adjust the set of combiner coefficients based on the plurality of output signals by separating the first plurality of preliminary output signals and the second plurality of preliminary output signals using a third blind source separation technique.

4. The signal processing apparatus of claim 3, wherein the third blind source separation technique is an independent component analysis.

5. The signal processing apparatus of claim 1, wherein the combiner is configured to combine the first plurality of preliminary output signals with the second plurality of preliminary output signals based on the set of combiner coefficients as a linear combination of a first preliminary output signal of the first plurality of preliminary output signals and a first preliminary output signal of the second plurality of preliminary output signals weighted by the set of combiner coefficients to obtain a first output signal of the plurality of output signals and as a linear combination of a second preliminary output signal of the first plurality of preliminary output signals and a second preliminary output signal of the second plurality of preliminary output signals weighted by the set of combiner coefficients to obtain a second output signal of the plurality of output signals.

6. The signal processing apparatus of claim 5, wherein the combiner is configured to select at least one blind source separator from the plurality of blind source separators and to set the combiner coefficients associated with the other blind source separators of the plurality of blind source separators equal to zero.

7. The signal processing apparatus of claim 6, wherein the combiner is configured to select the at least one blind source separator from the plurality of blind source separators based on a performance measure of the plurality of blind source separators.

8. The signal processing apparatus of claim 7, wherein the performance measure is a cost function based on the Karhunen-Loeve transform.

9. The signal processing apparatus of claim 1, wherein the adjuster is configured to adjust the first set of coefficients of the first blind source separator and the second set of coefficients of the second blind source separator based on a performance measure of the plurality of blind source separators.

10. The signal processing apparatus of claim 9, wherein the performance measure is a cost function based on the Karhunen-Loeve transform.

11. The signal processing apparatus of claim 1, wherein one or more of the first blind source separation technique and the second blind source separation technique fulfill one or more of the following statistical conditions: nongaussianity, nonwhiteness and/or nonstationarity.

12. The signal processing apparatus of claim 1, wherein the first blind source separator is based on a first convolutive blind source separation technique and the second blind source separator is based on a second convolutive blind source separation technique.

13. The signal processing apparatus of claim 1, wherein the first blind source separator or the second blind source separator is based on one or more of the following blind source separation techniques: principal components analysis, singular value decomposition, independent component analysis, dependent component analysis and non-negative matrix factorization.

14. A signal processing method of separating a plurality of mixture signals from a MIMO system to obtain a plurality of output signals, the plurality of mixture signals are a response of the MIMO system to a plurality of source signals, the signal processing method comprising:
computing a first plurality of preliminary output signals on the basis of a first set of coefficients describing the MIMO system using a first blind source separator based on a first blind source separation technique and a second plurality of preliminary output signals on the basis of a second set of coefficients describing the MIMO system using a second blind source separator based on a second blind source separation technique;
combining the first plurality of preliminary output signals with the second plurality of preliminary output signals based on a set of combiner coefficients to obtain the plurality of output signals; and
adjusting the first set of coefficients of the first blind source separator and the second set of coefficients of the second blind source separator based on the plurality of output signals.

15. A non-transitory computer-readable medium for separating a plurality of mixture signals from a MIMO system to obtain a plurality of output signals, the plurality of mixture signals are a response of the MIMO system to a plurality of source signals, the non-transitory computer-readably medium storing instructions that when executed perform a single processing method comprising:
- computing a first plurality of preliminary output signals on the basis of a first set of coefficients describing the MIMO system using a first blind source separator based on a first blind source separation technique and a second plurality of preliminary output signals on the basis of a second set of coefficients describing the MIMO system using a second blind source separator based on a second blind source separation technique;
- combining the first plurality of preliminary output signals with the second plurality of preliminary output signals based on a set of combiner coefficients to obtain the plurality of output signals; and
- adjusting the first set of coefficients of the first blind source separator and the second set of coefficients of the second blind source separator based on the plurality of output signals.

* * * * *